June 19, 1923.
G. D. PARKER
VERTICAL ELEVATING APPARATUS
Filed May 8, 1922
1,459,246
2 Sheets-Sheet 1
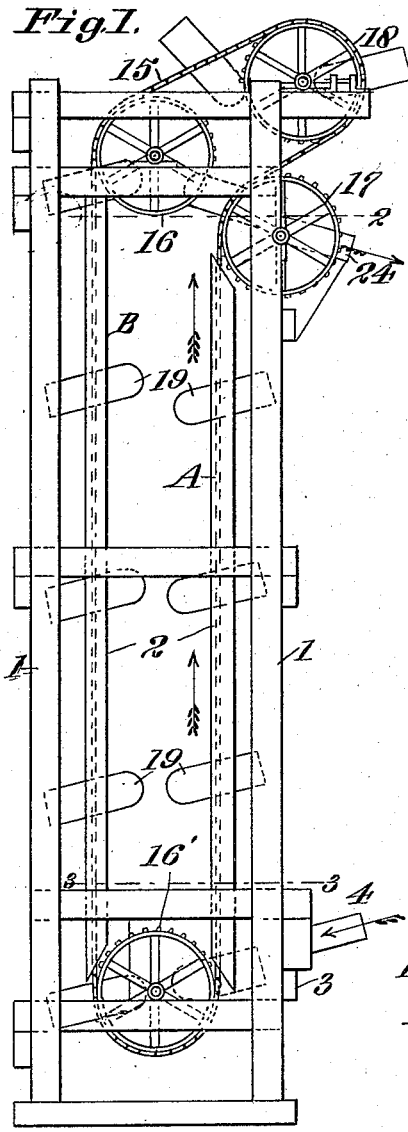
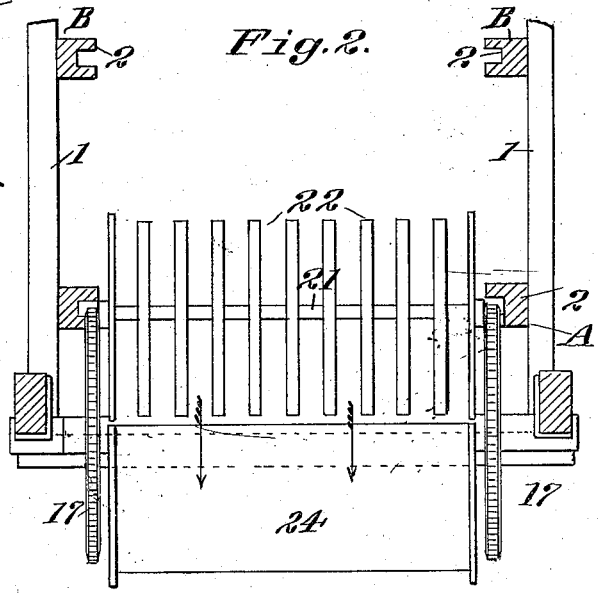
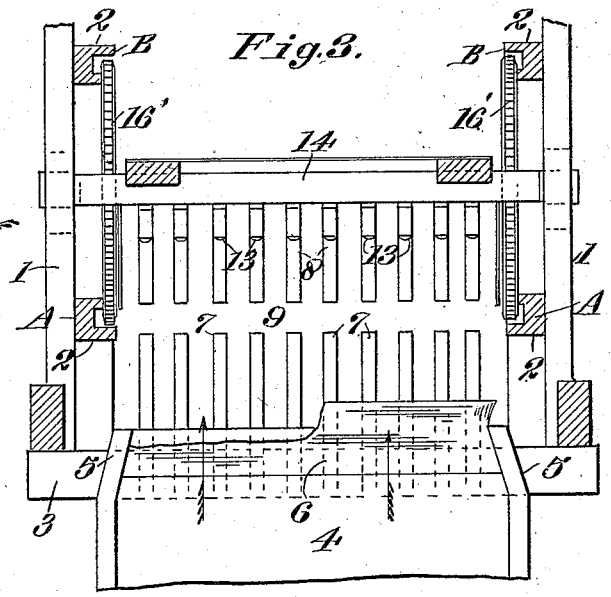
Inventor.
George D. Parker
By Acker & Totten
attorneys.

June 19, 1923.  1,459,246
G. D. PARKER
VERTICAL ELEVATING APPARATUS
Filed May 8, 1922  2 Sheets-Sheet 2
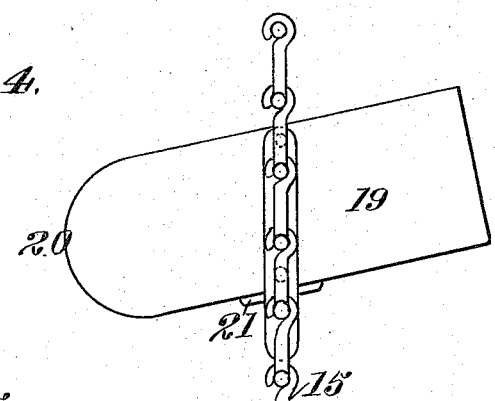
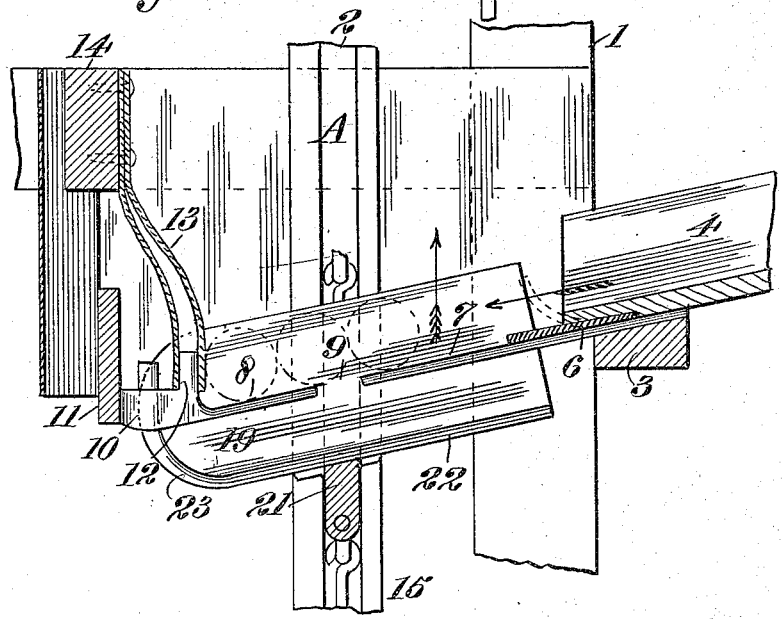
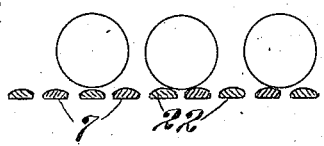

Patented June 19, 1923.

1,459,246

UNITED STATES PATENT OFFICE.

GEORGE D. PARKER, OF RIVERSIDE, CALIFORNIA, ASSIGNOR TO STEBLER PARKER CO., OF RIVERSIDE, CALIFORNIA, A CORPORATION OF CALIFORNIA.

VERTICAL-ELEVATING APPARATUS.

Application filed May 8, 1922. Serial No. 559,244.

*To all whom it may concern:*

Be it known that I, GEORGE D. PARKER, a citizen of the United States, residing at Riverside, in the county of Riverside and State of California, have invented certain new and useful Improvements in Vertical-Elevating Apparatus, of which the following is a specification.

The present invention relates to an elevating and dumping apparatus designed particularly for the elevating of fruit such as oranges in a packing house from one floor to another, or from the floor to a point near the ceiling and to discharge or dump the same when the desired point of elevation is reached.

The invention is particularly designed for the handling of fruit, as for example oranges, without bruising the same, and whereby the bruising of the oranges as received in the apparatus is reduced to a minimum, and wherein baskets or other elevating means are provided to receive the fruit and gently discharge the same at the point of elevation.

The invention consists primarily in a vertically movable conveyer preferably of the endless type carrying a series of elevating baskets composed of spaced arms which pass through an elevating station between elevating fingers in which the fruit is initially deposited, certain of the fingers of the elevating station, particularly those forming stops for limiting the inward movement of the fruit thereon being yieldably and flexibly suspended to reduce the bruising of the fruit to a minimum.

The invention consists further in the arrangement of the sprockets or wheels over which the conveyer passes at its upper end whereby the elevating baskets in their travel from one sprocket to another are gradually tipped forwardly to cause the the elevated fruit to roll and discharge therefrom.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in side elevation of the preferred embodiment of my apparatus.

Figure 2 is a transverse sectional view taken on line 2—2 of Figure 1, illustrating the discharge station.

Figure 3 is a transverse sectional view taken on line 3—3 of Figure 1 illustrating the fruit receiving station.

Figure 4 is a view in end elevation of one of the trays illustrating a portion of the flexible conveyer and one of the tray guiding shoes.

Figure 5 is a transverse vertical section taken approximately through the center of the receiving station illustrating an elevating tray or basket in a position about to pass through the receiving station, and Figure 6 is a transverse sectional view illustrating fruit resting on the arm of the receiving station.

Referring more particularly to the several views of the drawings wherein like characters of reference designate corresponding parts, 1 indicates the frame structure of my preferred form of apparatus, and which frame structure mounts the vertically disposed guides 2 preferably four in number and disposed in pairs opposite each other, one pair affording a guide A for the elevating flight, and the other pair affording a guide B for the return flight of the endless conveyer. At the base of the frame 1, preferably at its forward edge extends a support 3, Figures 1, 3 and 5, which is transversely disposed, and on the same rests the discharge end of a downwardly inclined delivery board or chute 4, the discharge end of which converges or is restricted, as at 5. Mounted with one edge resting on the discharge end of said delivery board or chute 4 is a flexible flap or fruit arresting member 6, the free edge of which projects a distance inwardly over the ends of parallel spaced fruit receiving and supporting fingers 7 secured at their rear ends to the member 3. The fingers 7 form a portion of the material receiving station and disposed one in alignment with each of said fingers 7 with their upper surface in a plane parallel therewith are other fruit receiving and supporting fingers 8, which fingers are disposed with their free ends in slight spaced relation to the ends of fingers 7 affording between the two a passage 9 which lies between the guide members 2 forming the guide for the elevating flight A of the endless conveyer.

The fingers 8 are each formed at their rear end with an enlarged portion 10 which is adapted to abut against the stop 11, and upwardly from said fingers, intermediate their length, extends a mounting stud 12 over which is positioned the lower end of a yieldable finger supporting member 13 preferably constructed of rubber hose or like material. The members 13 depend in parallel spaced relation from a mounting member 14 at the rear of the lower end of the frame 1, and their tendency is, when the fingers 8 are free of load, to space the portions 10 thereof from the abutment 11 and afford a yield to the fingers when the fruit is deposited thereon. By constructing the members 13 of hose or other yieldable material and extending the lower ends thereof downwardly for a distance over the studs 12, a buffer is provided against which the fruit contacts when it rolls downwardly onto the fingers 8.

The elevating mechanism consists of a pair of endless flexible elevating members 15 illustrated as of chain construction, and each of said members is divided into parallel flights by the arrangement of the sprockets 16 and 16' disposed respectively at the upper and lower ends of the guides 2 as illustrated in Figure 1, and around which the respective endless conveying members pass. At the upper end of the guide 2 for the elevating flight 8 of each member 15 is mounted a rotatable idler sprocket 17, and above said sprockets 17 is mounted a pair of what may be termed offset sprockets 18, the axes of rotation of which is in advance of the axis of rotation of the idler 17. The sprockets 16, 17 and 18 are disposed with their axes, when viewed from the end, in triangular formation to cause that portion of the flexible member 15 passing from sprockets 17 to 18 to be forwardly inclined for the hereinafter described purpose. At intervals each flexible member 15 carries a tray guide shoe, which operate in the guides 2, and to these guide shoes are secured the elevating tray end members 19, preferably rounded at their rear ends as at 20, and of a length to pass upwardly between members 4 and 11 of the material receiving station. The tray end members 19 are mounted on the ends of a transversely disposed supporting bar 21, which is adapted to pass upwardly through the slot or opening 9 afforded between the spaced ends of fingers 7 and 8 of the receiving station. The supporting bar 21 of each elevating tray or basket carries on its upper surface a plurality of parallel spaced elevating arms 22 inclined parallel with the plane of the fingers 7 and 8, and which are arranged, on the upward movement of the tray or basket, to pass one between each aligned pair of fingers 7 and 8 and elevate the fruit from said fingers 7 and 8 which has been deposited thereon. The rear ends of the arms 22 are upwardly curved or bent as at 23 to form a stop, and said upwardly curved or bent portions in the passage of the basket or tray upwardly through the elevating station pass upwardly between the yieldable finger supporting members 14, as illustrated in Figure 5. It will be observed that each basket or tray, in its upward movement through the receiving station, gently elevates the fruit from the station, and in so doing the discharge ends of said elevating arms 22 contact with the free end of the flexible member 6, raising the same to dotted lines, as in Figure 5, which operation cuts off the flow of fruit onto the fingers 7 and 8 until such time as this particular tray has passed upwardly through the elevating station. After leaving the elevating station, the trays or baskets are moved upwardly, as indicated in Figure 1, and as the guiding shoes at the ends thereof pass from the upper ends of the guides 2 of the elevating flight A, the flexible members 15 at the opposite end of said baskets pass over the idlers 17, which movement causes a forward tipping of the basket and a consequent rolling or passage of the fruit forwardly therefrom onto a discharge chute 24, which is downwardly inclined, and which may lead to any suitable point. The flexible members continuing in their travel pass around the offset sprockets 18 downwardly over the sprockets 16 at which point the tray guiding shoes are received in the return guide for the flight B which directs the trays in an inverted condition to a point in rear of the receiving station, after which time they pass around the sprockets 16' and again move upwardly through the receiving station, as heretofore described.

Power may be applied to any of the shafts mounting the sprockets to drive the same to cause a movement of the flexible members 15 in the direction indicated by the arrows in Figure 1.

It will be observed that the elevating tray or member is of greater depth from front to rear than is the material receiving station, also that the members 22 are downwardly inclined toward their upwardly curved ends 23, and that the members 13 curve outwardly from the support 14. This construction and arrangement of parts permits of a lesser quantity of fruit being received longitudinally of the members 7 and 8 between the members 4 and 12 than is capable of being picked up and elevated by the members 22.

It will therefore be apparent that as the ends 23 of members 22 pass upwardly between the members 13, the fruit elevated from the members 7 and 8 will by the curvature of members 13 be permitted to roll by gravity downwardly on the members 22 and contact with the curved ends 23 thereof after the basket has cleared the receiving station, precluding the dropping or falling of the rearmost fruit resting in the baskets during the upward movement.

Having thus described my invention, what I claim as new and desire to secure by Letters Patent of the United States is:—

1. An elevating and dumping apparatus comprising a material receiving station consisting of a plurality of substantially horizontally disposed parallel spaced material receiving and supporting fingers, means for yieldably mounting the same and providing a stop at one end for arresting the movement of the material thereon, means in advance of the free ends of said fingers for delivering material to be elevated thereonto, a tray for removing material from said station and for elevating the same, said tray comprising a plurality of parallel spaced arms, adapted to pass upwardly between said supporting fingers, said arms being upwardly extended at their rear ends to provide a stop, means for mounting said arms, and means for elevating said tray and for tilting the same forwardly to discharge the material therefrom.

2. An elevating and dumping apparatus comprising a material receiving station consisting of a transverse mounting member, a zontally disposed parallel spaced material receiving and supporting fingers, means for yieldably mounting the same and providing a stop at one end for arresting the movement of the material thereon, means in advance of the free ends of said fingers for delivering materal to be elevated thereonto, a tray for removing material from said station and for elevating the same, said tray comprising a plurality of parallel spaced arms, adapted to pass upwardly between said supporting fingers, said arms being upwardly extended at their rear ends to provide a stop, means for mounting said arms, an endless means for moving the said tray in a fixed path and upwardly relatively to said receiving station, and means for causing said tray in its upward movement to tilt forwardly to discharge the material therefrom.

3. An elevating and dumping apparatus comprising a material receiving station consisting of a plurality of substantially horizontally disposed parallel spaced material receiving and supporting fingers, depending means associated with each finger for yieldably suspending the same and providing a stop for arresting the movement of the material thereon, means in advance of the free ends of said fingers for delivering material thereonto, a tray for removing the material from said station and for elevating the same, said tray comprising a plurality of parallel spaced arms adapted to pass upwardly between said supporting fingers, said arms being upwardly extended at their rear to provide a stop for arresting the movement of the material thereon, means for connecting said arms, and means for elevating said tray and for tilting the same forwardly to discharge the material therefrom.

4. An elevating and dumping apparatus comprising a material receiving station consisting of a plurality of parallel spaced pairs of aligned supporting fingers disposed with adjacent co-operating ends in slight spaced relation, means for suspending corresponding ends of certain fingers of said pairs of fingers, said means providing a yieldable stop for arresting the movement of the material thereon, an elevating tray comprising a horizontally disposed supporting bar, a plurality of elevating arms extending at right angles from opposite sides of said bar in parallel spaced relation and disposed to pass one between adjacent spaced fingers, with said supporting bar passing between the spaced ends of said fingers, said arms being upwardly extended at their rear ends, means connected with the ends of said supporting bar for moving the tray in a fixed path, and means for causing a tilting of the said elevating tray forwardly to discharge the elevated contents therefrom.

5. An elevating and dumping apparatus comprising a conveyer formed of a pair of parallel spaced endless elevating members, pairs of sprockets over which the same operate, said sprockets dividing the conveyer into flights, means for operating the sprockets, a material receiving station at the base of one flight and consisting of a plurality of parallel spaced pairs of aligned supporting fingers, disposed with adjacent co-operating ends in slight spaced relation, means for suspending corresponding ends of certain fingers of said pairs of fingers and providing a yieldable stop for arresting the movement of the material thereon, a horizontally disposed elevating tray comprising a supporting bar connected at its opposite ends with said flexible members, a plurality of elevating arms extending at right angles from opposite sides of said bar in parallel spaced relation and disposed to pass one between adjacent spaced fingers with said supporting bar passing between the spaced ends of said fingers, corresponding ends of said arms being upwardly extended, and certain of said supporting sprockets being offset from the others to cause a tilting of said elevating tray in its passage thereover to discharge its contents.

6. An elevating and dumping apparatus comprising a pair of spaced guides, an endless flexible member movable in each guide, a pair of sprockets at the upper and lower ends of said guides over which said members operate, the upper pair of sprockets being offset in front of the guides, a pair of idler sprockets over which said flexible members pass in their travel to and from said offset sprockets, an elevating tray disposed to pass vertically between said guides and connected at its ends to said endless flexible members, said tray comprising a plurality of spaced supporting arms upwardly curved at their rear ends and downwardly inclined from their upwardly curved rear ends, a receiving station upwardly through which said arms pass, said station comprising a plurality of yieldably suspended parallel spaced material receiving and supporting fingers arranged with their main portions substantially horizontally disposed between which said arms are adapted to upwardly pass, and means in advance of said fingers for delivering material to be elevated thereto, said tray adapted when passing between one pair of idlers and said pair of offset sprockets to be tilted forwardly to discharge the material therefrom.

7. An elevating and dumping apparatus comprising a material receiving station consisting of a transverse mounting member, a plurality of flexible supports depending therefrom in spaced relation, a supporting finger secured to the lower end of each support, said fingers extending at right angles therefrom in a substantially horizontal plane, an elevating tray movable upwardly through said receiving station, and comprising a plurality of spaced supporting arms upwardly curved at their rear ends and arranged with their major portion downwardly inclined toward the upwardly curved rear ends, said arms adapted on the upward movement of said tray to pass upwardly between said fingers, a guide for said tray, means for moving the tray in a fixed path upwardly through said receiving station, means within the path of upward movement of the tray to cause the same to tip forwardly to discharge its contents, and a material receiving member in front of said receiving station for receiving material and directing the same onto said fingers.

8. An elevating and dumping apparatus, comprising a material receiving station including a transverse support, a plurality of flexible finger supports of yieldable material depending therefrom in parallel spaced relation, a plurality of material supporting fingers extending laterally in the same direction from the free lower ends thereof to provide a substantially horizontal material support, means in advance thereof and in substantially the same plane with said fingers for receiving material and directing the same thereonto, a slotted elevating tray adapted to pass upwardly through said receiving station and remove the material therefrom, means for elevating said tray in a substantially vertical path, and means within the path of upward travel of the tray for tipping the same to dump the material therefrom.

9. An elevating and dumping apparatus, comprising a material receiving station including a transverse support, a plurality of flexible finger supports of yieldable material depending therefrom in parallel spaced relation, a plurality of material supporting fingers extending laterally in the same direction from the free lower ends thereof to provide a substantially horizontal material support disposed with its free edge in a slightly higher plane than the remainder, a plurality of parallel spaced connected arms providing an elevating tray, said arms provided on corresponding ends with upward extensions according a material stop, means for moving said tray upwardly through said receiving station, means for delivering material to be elevated onto said receiving station, means for tipping the elevating tray in its movement to discharge the elevated material therefrom, and means for receiving the material discharged from said tray.

10. An elevating and dumping apparatus including a slotted material receiving station, an upwardly movable elevating tray adapted for upward movement through said receiving station and consisting of a plurality of interconnected slats adapted to pass between the slats of said receiving station to remove material therefrom and to elevate the same, the base of said tray being normally inwardly and downwardly inclined toward one edge, means at the low edge of the tray affording a material stop, and means within the path of movement of the tray for causing a forward tipping of the same to discharge the material therefrom.

11. An elevating and dumping apparatus including a slotted upwardly moving elevating member, a material delivery chute, a slotted material receiving station for receiving material from said chute and upwardly through which the elevating member passes to remove material therefrom and elevate the same, and an upwardly movable flexible apron associated with said receiving station between the station and chute for acting on by the elevating means to arrest the movement of the material from the chute onto the station during the upward passage of the elevating means therethrough.

12. An elevating and dumping apparatus including a slotted upwardly movable elevating member, a slotted material receiving station upwardly through which the elevating member passes to remove material therefrom and elevate the same, and a flexible upwardly movable flap associated with said receiving station and within the path of upward movement of said elevating member for raising by the upward movement of said member to arrest the movement of material onto said receiving station during the passage of the elevating member therethrough.

13. An elevating apparatus including a material receiving station having a supporting wall downwardly inclined toward its rear end, a material stop wall at the rear thereof, an elevating basket upwardly movable through said receiving station, said basket provided with a downwardly inclined supporting wall, and a material stop at its lower end, said basket being of greater depth capacity from front to rear than said receiving station whereby on passing through said receiving station the material thereon will move by gravity into contact with the stop and thereby lie a distance inwardly from the opposite end of the basket.

14. An elevating apparatus including an upwardly movable elevating basket provided with a downwardly inclined material supporting wall and a material stop extending upwardly from its lower end, a downwardly inclined material receiving station upwardly through which said basket moves, said station at its lower end provided with a stop wall upwardly in rear of which said basket stop wall moves, whereby material received from said receiving station will move by gravity into contact with said basket stop and thereby lie a distance inwardly from the opposite end of the basket.

15. An elevating apparatus including a material receiving station having a downwardly inclined material supporting bottom wall, and an upwardly and rearwardly inclined material stop wall extending upwardly from the lower end thereof, an elevating tray movable upwardly through said receiving station and provided with a downwardly inclined material supporting bottom wall and a material stop extended upwardly from the lower end thereof, said rear stop adapted to pass upwardly through said material receiving station in rear of the foremost point of said stop wall of the receiving station whereby the material as picked up by said tray moves by gravity toward the rear of said tray and into contact with said station stop wall during the passage of the basket therethrough.

16. An elevating apparatus including a material receiving station consisting of a material supporting bottom wall and a rearwardly inclined material stop wall extending upwardly from the rear thereof, an elevating tray movable upwardly through said receiving station and provided with a downwardly inclined material supporting bottom wall and a material stop extended upwardly from the lower end thereof, said rear stop adapted to pass upwardly through said material receiving station in rear of the foremost point of said stop wall of the receiving station whereby the material as picked up by said tray moves by gravity toward the rear of said tray and into contact with said station stop wall during the passage of the basket therethrough.

In testimony whereof I have signed my name to this specification.

GEORGE D. PARKER.